United States Patent
Wesenhagen

[11] Patent Number: 5,674,515
[45] Date of Patent: Oct. 7, 1997

[54] METHOD AND PRODUCT FOR DISPENSING MEDICATION FOR ANIMALS

[76] Inventor: Humphrey Erwin Wesenhagen, P.O. Box 111133, Campbell, Calif. 95011

[21] Appl. No.: 304,788

[22] Filed: Sep. 12, 1994

[51] Int. Cl.⁶ .................................................. A01N 25/00
[52] U.S. Cl. ........................ 424/405; 424/400; 222/94; 222/386.5
[58] Field of Search ........................... 424/405; 222/94, 222/386.5

[56] References Cited

U.S. PATENT DOCUMENTS 5,174,475  12/1992  Day et al. ............................ 222/94
5,330,427  7/1994  Weissenburger .................. 222/386.5

Primary Examiner—Thurman K. Pace
Assistant Examiner—William E. Benston, Jr.
Attorney, Agent, or Firm—Robert Samuel Smith

[57] ABSTRACT

A food item and method for administering medication to a subject, particularly a dog wherein the food item is a short edible tube with an interior chamber having a closed end and open end providing that the medication may be inserted into the chamber through the open end of the tube and then the open end of the tube is pinched closed. The food item is composed of foodstuffs such as meats, a congealing agent, if necessary, such as flour and water, with a percentage of water selected to maintain a consistency of the foodstuff that maintains the shape of the tube in a handling operation yet is readily deformed by pinching the open end.

7 Claims, 1 Drawing Sheet

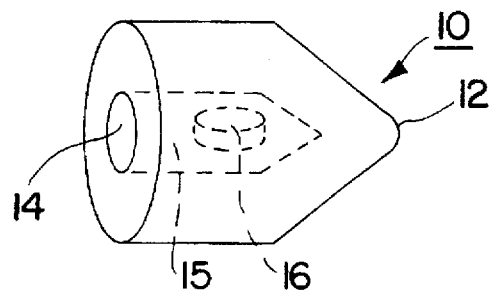
FIG. 1
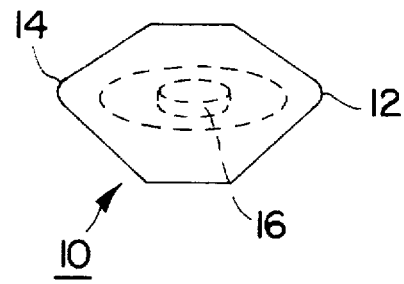
FIG. 2
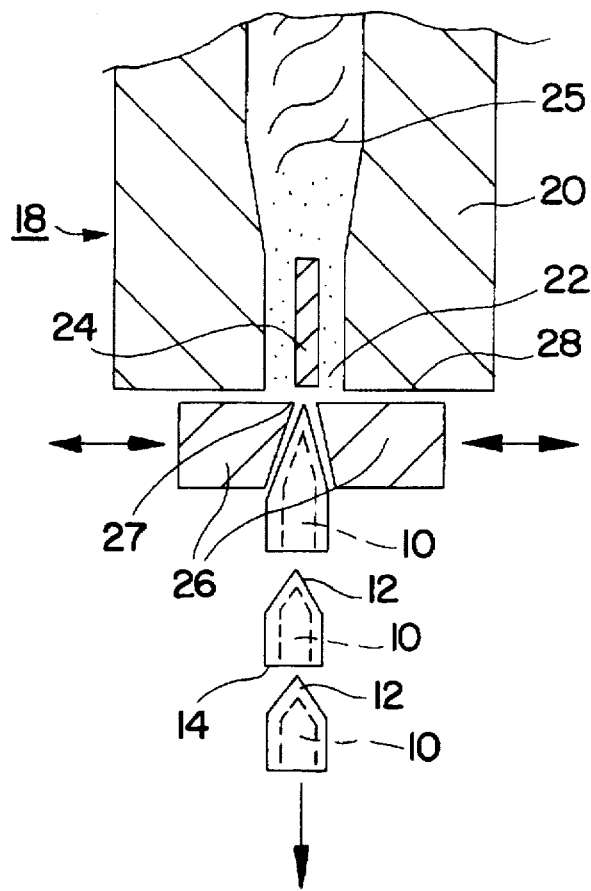
FIG. 3
FIG. 4

METHOD AND PRODUCT FOR DISPENSING MEDICATION FOR ANIMALS

FIELD OF THE INVENTION

This invention relates to feeding medication such as pills or liquid medicine drops to dogs, and particularly to a method in which a treat is provided in closeable form in which medication can be concealed.

BACKGROUND AND INFORMATION DISCLOSURE STATEMENT

Administering medication such as in the form of pills or drops is an important chore for most every pet owner. Various medications are administered for a number of reasons throughout the pets life including heart medication, heart worm prevention, antibiotics, deworming medications, vitamins, etc. The specific amount and medication varies from one dog to another. Administration of these medications is usually a disagreeable experience for the pet owner and often a very traumatic experience for the pet. When the medication is in the form of a liquid or pill, the owner has to pry open the dogs mouth and forcefeed the pet by pouring or pushing the medication down the dog's throat. If the medication in the form of a pill is placed in the dogs food, a dog will often eat around the medication and leave it on the plate. This is true even when the owner buries the pill in the food because the dog can often smell the medication and leave it on the plate. Oftentimes, the owner is never entirely certain that the pet ate the medication with the food. If a large group of animals must receive medication, such as in an animal kennel where the proprietor must administer medication to a large number of dogs, then the process of feeding medication to each dog is especially prolonged.

SUMMARY

It is therefore an object of this invention to provide a product and method for dispensing medication to a dog that overcomes the difficulties listed in the BACKGROUND. This invention is directed toward a food item or treat in which each treat has a composition and shape that permits medication in any form (liquid, pill or powder) and a range of sizes of dose to be conveniently concealed and sealed.

DRAWINGS

FIG. 1 shows the treat of this invention.

FIG. 2 shows the treat of FIG. 1 with closed ends.

FIG. 3 shows an extruder for manufacturing treats.

FIG. 4 lists steps in the method of this invention.

DESCRIPTION OF A PREFERRED EMBODIMENT

Turning now to a discussion of the drawings, FIG. 1 shows one embodiment of a food item 10 (treat) of this invention being an edible tube that is closed on one end 12 and open at the other end 14. The medication 16 (in phantom) is placed in the tube 10 through the open end 14. Then the open end 14 of the tube 10 is pinched closed as shown in FIG. 2 thereby concealing the medication 16 and preventing the medication 16 from giving off an odor. The tube 10 is made of foodstuff pleasing to the dog's palate and is small enough so that he gulps the food "treat" including the concealed medication without hesitation.

The tube 10 is made of a foodstuff that is any one of a number of choices which are popular with dogs, such as ground poultry, ground beef or horse meat, etc. One feature of the invention is the selection of a moisture content of the foodstuff which maintains the general tubular form of the item when the item is packaged as one of a group of items such as in a can or box yet is sufficiently moldable to permit the open end 14 of the tube 10 to be pinched closed after the medication 16 is inserted therein. The appropriate moisture content depends on the nature and consistency of the selected foodstuff but a useful range of moisture content for the purposes of this invention is between ten to forty percent. The choice of foodstuff composition may also include vegetable matter such as flour mixed with water to maintain the congealed state of the foodstuff in order to preserve the tubular shape of the product.

Some food products used in this invention require moderate baking. A temperature in the range 200° F. to 375° F. is preferred. In order to preserve the moisture content of the treat (item) 10, it is preferable to enclose the neat 10 in a moisture barrier until it is consumed. For this purpose, the treats may be packaged as a group in a moisture tight container or wrapped individually in a plastic foil.

Another important feature of the invention is the selection of the size of the treat 10. The size is selected according to the size of the dog. If a treat is small enough, the dog will gulp down a treat in one swallow rather than chew up the treat or let it linger in his mouth. Accordingly, the dog treats 10 of this invention are selected from a preferred range of sizes between three eighths and one inch in diameter and three quarters to one and a half inches long. The diameter of the chamber 15 inside the treat is selected from a preferred range between three sixteenths to five eighths of an inch.

The treats 10 available in bulk quantities are a great convenience to operators of dog kennels who are required to administer medication to a large number of dogs. The operator need only insert the medication in each treat 10 and serve the treat 10 along with the rest of the dogs dinner with the assurance that the dog will take his medicine.

A preferred method of manufacture is by molding such as forcing the food stuff into a cavity mold or by extrusion through an extrusion die. FIG. 2. shows a sectional view of an extruder die 18 shown having a barrel 20, and an orifice 22 with a centrally located core 24. As the extruder screw 25 rotates, forcing foodstuff through the orifice 22, a pair of reciprocating wedges 26 slide across the face 28 of the die 18 toward and away from one another such that cutting edges 27 of the wedges 26 cut the extruded tube 10 and pinch off the end of the treat proximal to the face 28 leaving open the end 14 of the tube 10 remote from the face 28.

The steps in administering medication utilizing the treats of this invention are listed in FIG. 4, according to which:

In step 1: providing a tube composed of foodstuff having an interior chamber with a closed end and an open end;

In step 2: inserting the medication through the open end into the interior chamber;

In step 3: pinching the open end such as to close the open end of the interior chamber;

In step 4: presenting the tube with medication in the interior chamber to the subject (dog) and allowing the subject to eat the tube containing medication.

Other variations and modifications may be considered which are within the scope of the invention.

For example, the extruded tube may have a triangular or square outer cross sectional shape. The treat may be a pellet having a pyramidal shape in which case the treat would be cast in a mold rather than extruded.

While the treat and method of administering the medication using the treat of this invention has been described as being particularly effective when administered to subjects which are dogs, it will be recognized that the same method and food item (with appropriate selection of composition of food) may also be effective with other subjects, including humans.

In view of the various modifications that may be considered, I therefore wish to define my invention by the scope of the appended claims.

I claim:

1. An article for dispensing a medicament comprising:

a tube made of foodstuff and having at least one open end wherein said tube has an interior chamber adapted for receiving said medicament through said open end, providing that a user is enabled to position said medicament in said tube and present said tube containing said medicament for consumption by said animal whereby said animal is motivated by smelling said foodstuff to swallow said tube containing said medicament without detecting said medicament.

2. An article as in claim 1 wherein said foodstuff is selected from a group of foodstuffs that consists of meat and vegetables.

3. An article as in claim 1 wherein said tube has a cross sectional shape selected from a group of shapes that consists of a triangle, a circle and a square.

4. An article as in claim 1 wherein said tube is made of foodstuff having a moisture content selected to retain a shape of said tube and permit closing said open end after said medicament is positioned in said interior chamber by pinching said open end.

5. An article as in claim 1 wherein said tube has a length selected from a range of lengths between one quarter to one and one half inches long.

6. An article as in claim 1 wherein said tube has an outside diameter selected from a range of diameters between one quarter to one inch.

7. An article as in claim 1 wherein said foodstuff has a range of moisture content between ten and forty percent.

* * * * *